US012573181B2

(12) United States Patent
Namiki et al.

(10) Patent No.: US 12,573,181 B2
(45) Date of Patent: Mar. 10, 2026

(54) LEARNING DEVICE, LEARNING METHOD, AND RECORDING MEDIUM

(71) Applicant: NEC Corporation, Tokyo (JP)

(72) Inventors: Shigeaki Namiki, Tokyo (JP); Shoji Yachida, Tokyo (JP); Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 456 days.

(21) Appl. No.: 18/266,887

(22) PCT Filed: Dec. 22, 2020

(86) PCT No.: PCT/JP2020/047928
    § 371 (c)(1),
    (2) Date: Jun. 13, 2023

(87) PCT Pub. No.: WO2022/137337
    PCT Pub. Date: Jun. 30, 2022

(65) Prior Publication Data
    US 2024/0104902 A1     Mar. 28, 2024

(51) Int. Cl.
    G06V 10/774        (2022.01)
    G06V 10/44         (2022.01)
            (Continued)

(52) U.S. Cl.
    CPC ............ G06V 10/774 (2022.01); G06V 10/44 (2022.01); G06V 10/764 (2022.01); G06V 10/98 (2022.01)

(58) Field of Classification Search
    CPC .... G06V 10/774; G06V 10/44; G06V 10/764; G06V 10/98; G06V 10/82; G06F 18/214; G06T 7/00
    See application file for complete search history.

(56) References Cited

U.S. PATENT DOCUMENTS 11,823,480 B2 * 11/2023 Kim ..................... G06N 3/0464
12,136,230 B2 * 11/2024 Meier ....................... G06T 7/70
            (Continued)

FOREIGN PATENT DOCUMENTS

JP        2013-161298 A        8/2013
JP        2016-110635 A        6/2016
            (Continued)

OTHER PUBLICATIONS

X. Peng and K. Saenko, "Synthetic to Real Adaptation with Generative Correlation Alignment Networks," 2018 IEEE Winter Conference on Applications of Computer Vision (WACV), Lake Tahoe, NV, USA, 2018, pp. 1982-1991, (Year: 2018).*
            (Continued)

*Primary Examiner* — Wesley J Tucker
(74) *Attorney, Agent, or Firm* — Sughrue Mion, PLLC

(57)            ABSTRACT

A data acquisition means acquires source domain data and target domain data. An alignment means performs an alignment which converts the source domain data and the target domain data into images of a predetermined reference angle. A feature extraction means extracts local features of the source domain data and the target domain data. A classification means classifies a class based on the local features of the source domain data and the target domain data after the alignment. A learning means trains the feature extraction means based on the local features of the source domain data and the target domain data after the alignment and a classification result of the class.

12 Claims, 13 Drawing Sheets

(51) Int. Cl.
    *G06V 10/764*     (2022.01)
    *G06V 10/98*     (2022.01)

(56)         References Cited

U.S. PATENT DOCUMENTS

| | | | |
|---|---|---|---|
| 2016/0155020 A1 | 6/2016 | Usman et al. | |
| 2019/0311199 A1* | 10/2019 | Mukherjee | G06T 7/75 |
| 2019/0325299 A1* | 10/2019 | Oliveira Pinheiro | G06N 3/0464 |
| 2020/0012846 A1* | 1/2020 | Moravec | G06V 10/776 |
| 2020/0272897 A1 | 8/2020 | Ishii | |
| 2021/0201152 A1* | 7/2021 | Santillán Perez | G06N 3/09 |
| 2022/0239884 A1* | 7/2022 | Zhao | H04N 13/275 |
| 2024/0005504 A1* | 1/2024 | Ribeiro | G06T 7/0014 |
| 2024/0062525 A1* | 2/2024 | Tai | G06V 10/774 |
| 2024/0338878 A1* | 10/2024 | Kwak | G06T 15/00 |
| 2025/0028046 A1* | 1/2025 | Jin | G01S 17/89 |
| 2025/0316072 A1* | 10/2025 | Marvasti | G01S 17/89 |

FOREIGN PATENT DOCUMENTS

| | | |
|---|---|---|
| JP | 2018-106216 A | 7/2018 |
| JP | 2019-028876 A | 2/2019 |
| WO | 2019/102962 A1 | 5/2019 |

OTHER PUBLICATIONS

Wang, Y., Li, S., Jia, M., Liang, W. (2016). Viewpoint Estimation for Objects with Convolutional Neural Network Trained on Synthetic Images. In: Chen, E., Gong, Y., Tie, Y. (eds) Advances in Multimedia Information Processing—PCM 2016. PCM 2016. Lecture Notes in Computer Science( ), vol. 9917. (Year: 2016).*

International Search Report for PCT Application No. PCT/JP2020/047928, mailed on Mar. 9, 2021.

Masato Ishii et al., "Joint Optimization of Feature Transform and Instance Weighting for Domain Adaptation", NEC Information and Media Processing Laboratories, The 30th Annual Conference of the Japanese Society for artificial intelligence, 2016, pp. 1-4.

\* cited by examiner

Figure 4:
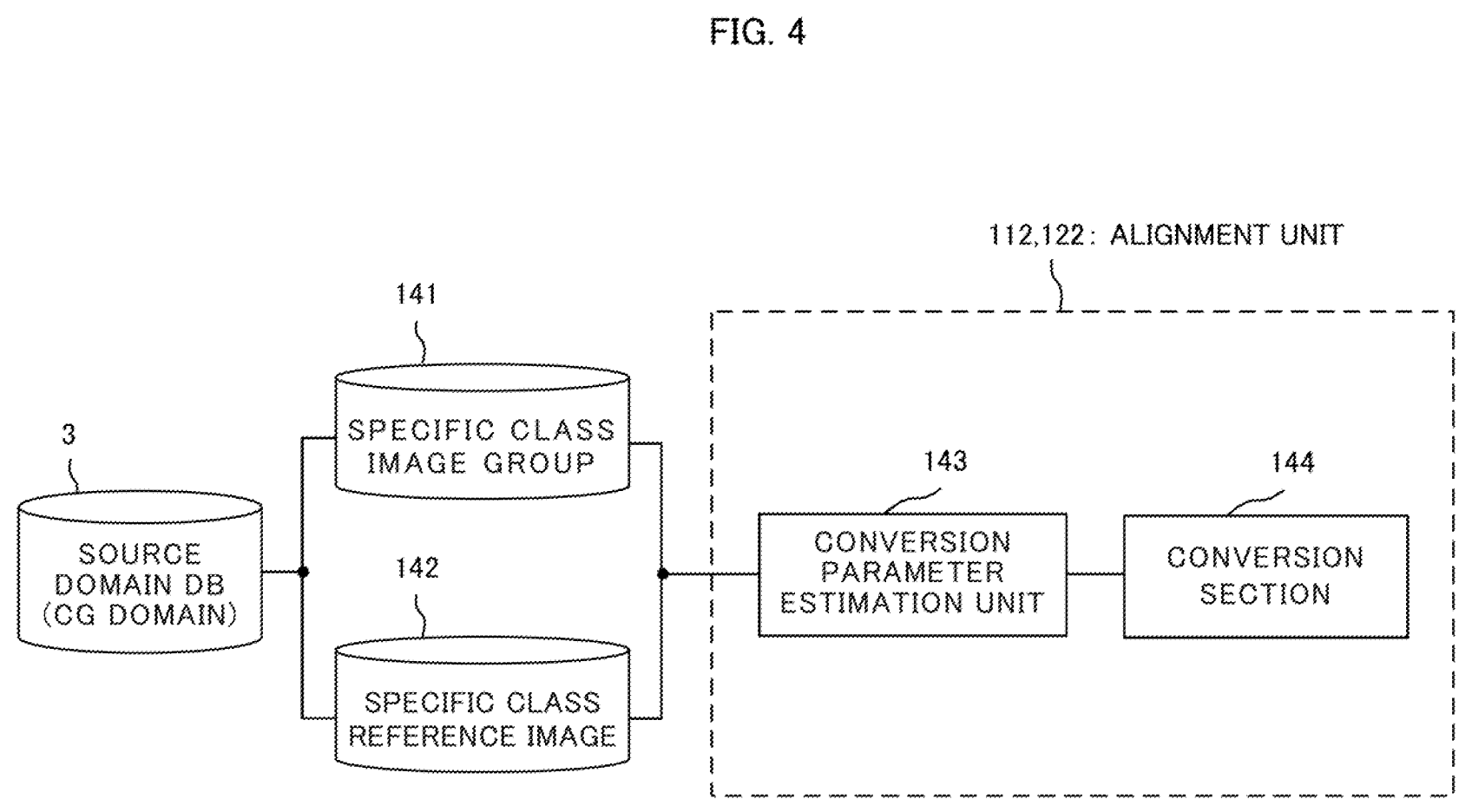

112,122 : ALIGNMENT UNIT

144 — CONVERSION SECTION

143 — CONVERSION PARAMETER ESTIMATION UNIT

141 — SPECIFIC CLASS IMAGE GROUP

142 — SPECIFIC CLASS REFERENCE IMAGE

3 — SOURCE DOMAIN DB (CG DOMAIN)

LEARNING DEVICE, LEARNING METHOD, AND RECORDING MEDIUM

This application is a National Stage Entry of PCT/JP2020/047928 filed on Dec. 22, 2020, the contents of all of which are incorporated herein by reference, in their entirety.

TECHNICAL FIELD

The present disclosure relates to a technique of an image classification using machine learning.

BACKGROUND ART

In a case where a sufficient amount of training data cannot be acquired in learning a model of machine learning used for an image recognition or the like, the amount of the training data is increased by a data augmentation. Patent Documents 1 and 2 describe examples of a data expansion method. In addition, Patent Document 3 describes a technique for duplicating training data of a particular class to be recognized in a case where the amount of the training data of that class is smaller than that of the other classes.

PRECEDING TECHNICAL REFERENCES

Patent Document

Patent Document 1: Japanese Laid-open Patent Publication No. 2019-028876
Patent Document 1: Japanese Laid-open Patent Publication No. 2018-106216
Patent Document 1: Japanese Laid-open Patent Publication No. 2013-161298

SUMMARY

Problem to be Solved by the Invention

In an image classification, there is a detailed classification problem as a problem of classifying types of objects, or the like. The detailed classification problem is a problem for originally classifying similar categories, for example, a problem of determining a dog type from an image of a dog, determining a flower type from an image of a flower, or determining a car type from an image of a car. In the detailed classification problem, the classification becomes very difficult in a case where a variance in the category is large and a variance between categories is small. For this reason, a method has been proposed in which local features are extracted from the entire image and classified by focusing on the local features. However, in the detailed classification problem, there is a problem that it is impossible to simply increase an amount of learning data by a data augmentation because the classification is carried out using the local features.

It is one object of the present disclosure to provide a learning device capable of improving accuracy of a model which carries out the detailed classification.

Means for Solving the Problem

According to an example aspect of the present disclosure, there is provided a learning device including:
a data acquisition means configured to acquire source domain data and target domain data;

an alignment means configured to perform an alignment which converts the source domain data and the target domain data into images of a predetermined reference angle;
a feature extraction means configured to extract local features of the source domain data and the target domain data;
a classification means configured to classify a class based on the local features of the source domain data and the target domain data after the alignment; and
a learning means configured to train the feature extraction means based on the local features of the source domain data and the target domain data after the alignment and a classification result of the class.

According to another example aspect of the present disclosure, there is provided a learning method, including:
acquiring source domain data and target domain data;
performing an alignment which converts the source domain data and the target domain data into images of a predetermined reference angle;
extracting local features of the source domain data and the target domain data;
classifying a class based on the local features of the source domain data and the target domain data after the alignment; and
training a feature extraction means based on the local features of the source domain data and the target domain data after the alignment and a classification result of the class.

According to a further example aspect of the present disclosure, there is provided a recording medium storing a program, the program causing a computer to perform a process including:
acquiring source domain data and target domain data;
performing an alignment which converts the source domain data and the target domain data into images of a predetermined reference angle;
extracting local features of the source domain data and the target domain data;
classifying a class based on the local features of the source domain data and the target domain data after the alignment; and
training a feature extraction means based on the local features of the source domain data and the target domain data after the alignment and a classification result of the class.

Effect of the Invention

According to the present disclosure, it becomes possible to provide a learning device capable of improving accuracy of a model which carries out a detailed classification.

BRIEF DESCRIPTION OF THE DRAWINGS

FIG. 4 is a block diagram illustrating a configuration at a time of training of an alignment unit.

FIG. 8 is a block diagram illustrating a functional configuration of a learning device according to a second example embodiment.

FIG. 9 is a block diagram illustrating a configuration at a time of training of an alignment unit.

EXAMPLE EMBODIMENTS

Figure 1:
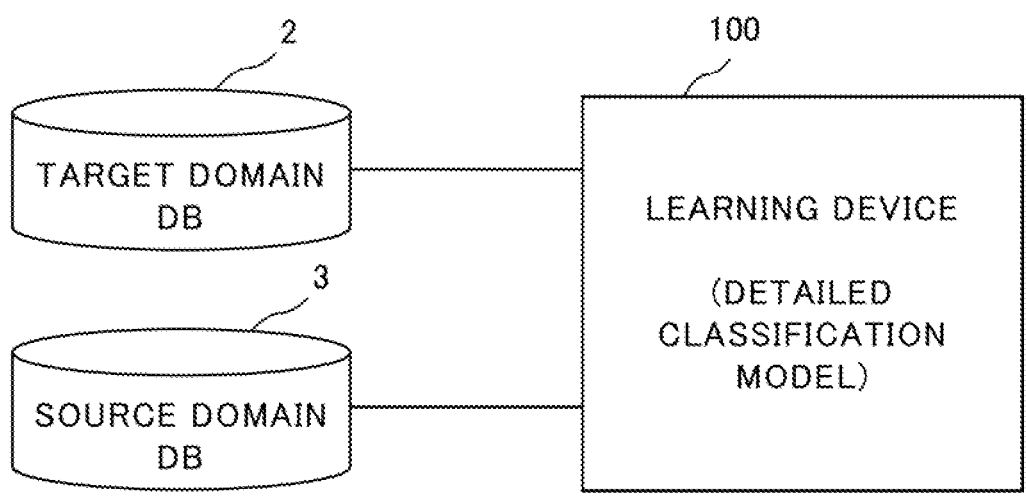
FIG. 1 illustrates a schematical configuration of a learning device according to a first example embodiment.

In the following, example embodiments will be described with reference to the accompanying drawings.

<Explanation of Principle>

A domain adaptation is used as a technique to improve a performance of a model in a case where an amount of training data used for learning a machine learning model in a certain area (domain) is insufficient. The domain adaptation is a technique to train a model in a target domain in which an amount of data is insufficient, by using data of a source domain in which a wealth of data is available. The domain adaptation uses data and label information from the source domain to train the model to be used in the target domain by bringing a data distribution of features in the target domain and the source domain as close as possible to match. Therefore, it is possible to improve the performance of the model used in the target domain even in a case where the amount of the training data in the target domain is insufficient.

In a case of performing a detailed classification, the above domain adaptation can basically be used to compensate for a shortage of the data in the target domain. However, since the detailed classification uses local features extracted from images for a classification as described above, it is necessary to map the local features between the source domain and the target domain.

As a concrete example, it is difficult to obtain a real image of the car, but in a case where CG (Computer Graphics) images can be obtained in abundance, the domain adaptation is carried out with a CG domain as the source domain and the real image domain as the target domain. At this time, it is necessary to map the local features obtained in the real image domain and the local features obtained in the CG domain. For instance, in a case of carrying out detailed classification regarding the car type, characteristic parts concerning each car type are extracted as the local features from an image. Suppose that "headlamps", "side mirrors", or the like are extracted as the local features. In this case, in order to perform the domain adaptation, it is needed to train by mapping between the local features obtained in the real image domain and the local features obtained in the CG domain. More specifically, it is necessary to perform training with the domain adaptation by using the local features of the headlamps obtained in the real image domain and the local features of the headlamps obtained in the CG domain, and to perform training with the domain adaptation by using the local features of the side mirrors obtained in the real image domain and the local features of the side mirrors obtained in the CG domain. Therefore, it is necessary to map the local features obtained in a domain to the local features obtained in another domain.

Furthermore, in the images obtained in each domain, angles and directions of capturing are often not consistent. For instance, in a case of the images of the car, an image of a front part of the car, an image of a rear part of the car, an image of the side part, and the like may be mixed together. In addition, even in similar images of the front part of the car, the angle at which the image was taken is often different. Therefore, in a case of mapping between the local features obtained in the real image domain and the local features obtained in the CG domain, it is necessary to match the angle and the direction of capturing.

In view of the above, in the present example embodiment, after performing an alignment for aligning objects, and positions and angles thereof indicated by the local features obtained in the different domains, that is, the real image domain and the CG domain, the training using the domain adaptation is performed. Accordingly, it is possible to normalize positions of the local features and to perform the data augmentation and the domain adaptation.

First Example Embodiment

[Learning Device]

Next, a learning device will be described according to a first example embodiment.

(Overall Configuration)

FIG. 1 illustrates a schematic configuration of the learning device according to the first example embodiment. A learning device 100 is a device for training a detailed classification model which performs the detailed classification, and is connected to a target domain database (hereinafter, a "database" is referred to as a "DB") 2 and a source domain DB 3. The target domain DB 2 stores target domain data which are the training data of the target domain. The source domain DB 3 stores source domain data which are the training data of the source domain. In the present example embodiment, the target domain data and the source domain data are image data. The training data are data used to train the machine learning model for performing an image recognition or the like, and include training image data and correct answer labels (teacher labels) for the training image data.

The learning device 100 trains a detailed classification model which performs the detailed classification of the image data in the target domain. Specifically, the learning device 100 performs the alignment with respect to the target domain data and the source domain data, and trains the detailed classification model using the local features extracted from the aligned data.

(Hardware Configuration)

Figure 2:
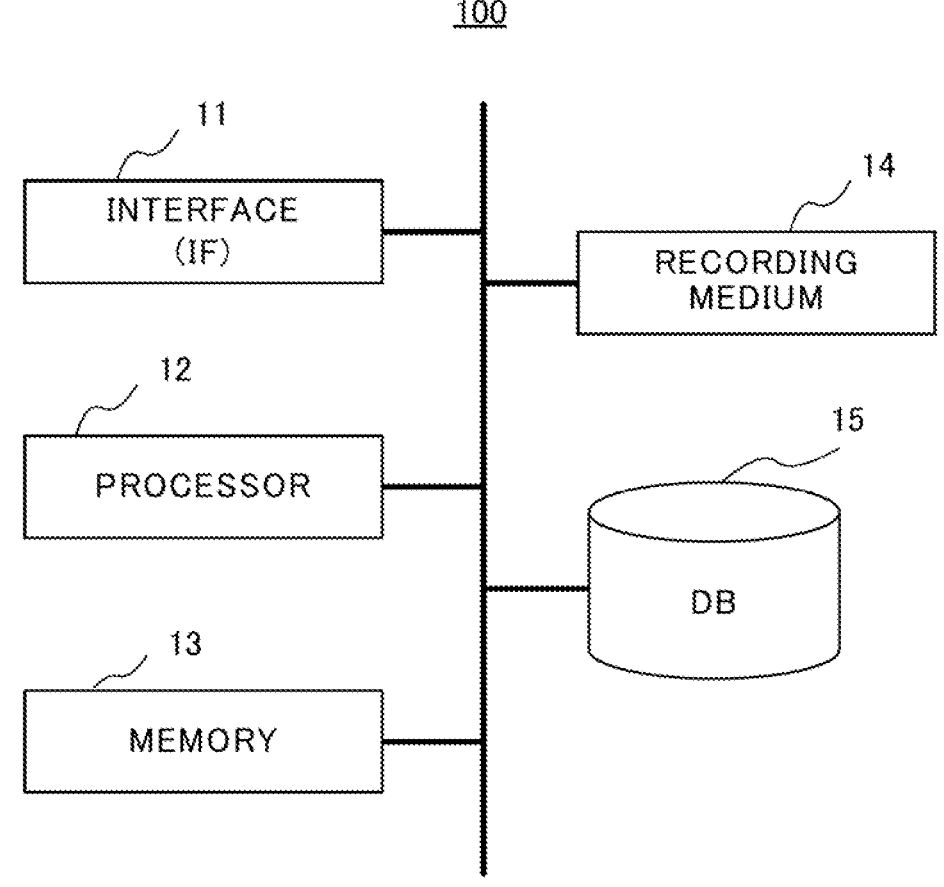
FIG. 2 is a block diagram illustrating a hardware configuration of the learning device according to the first example embodiment.

FIG. 2 is a block diagram illustrating a hardware configuration of the learning device 100. As illustrated, the learning device 100 includes an interface (hereinafter referred to as an "IF") 11, a processor 12, a memory 13, a recording medium 14, and a database (DB) 15.

The IF 11 inputs and outputs data to and from an external device. Specifically, the training data stored in the target domain DB 2 and the source domain DB 3 are input to the learning device 100 via the IF 11.

The processor 12 is a computer such as a CPU (Central Processing Unit) or a GPU (Graphics Processing Unit) and controls the whole of the learning device 100 by executing a program prepared in advance. Specifically, the processor 12 executes a learning process which will be described later.

The memory 13 is formed by a ROM (Read Only Memory), a RAM (Random Access Memory), and the like. The memory 13 is also used as a working memory during executions of various processes by the processor 12.

The recording medium 14 is a non-volatile and non-transitory recording medium such as a disk-shaped recording medium, a semiconductor memory, or the like, and is configured to be detachable to the learning device 100. The recording medium 14 records various programs executed by the processor 12. When the learning device 100 executes various types of processes, the program recorded in the recording medium 14 is loaded into the memory 13 and executed by the processor 12.

The database 15 temporarily stores data input through the IF 11 from the target domain DB 2 or the source domain DB 3. The learning device 100 may include a keyboard, an input section such as a mouse, and a display section such as a liquid crystal display to allow a user to give instructions or input.

(Function Configuration)

Figure 3:
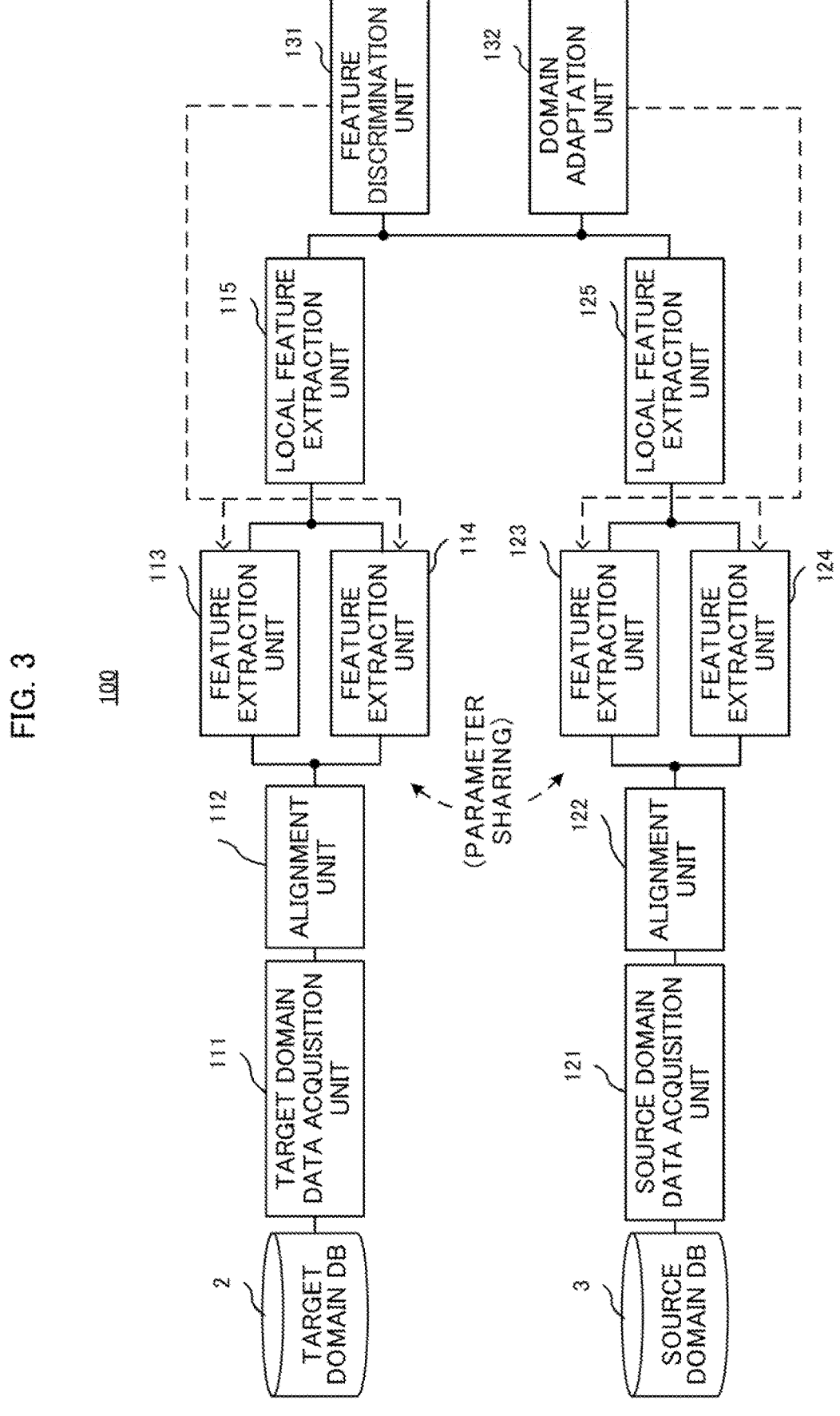
FIG. 3 is a block diagram illustrating a functional configuration of the learning device according to the first example embodiment.

FIG. 3 is a block diagram illustrating a functional configuration of the learning device 100 according to the first example embodiment. As illustrated, the learning device 100 includes a target domain data acquisition unit 111, a source domain data acquisition unit 121, alignment units 112 and 122, feature extraction units 113, 114, 123 and 124, local feature extraction units 115 and 125, a feature discrimination unit 131, and a domain adaptation unit 132.

The target domain data acquisition unit 111 acquires image data of the target domain from the target domain DB 2, and outputs the image data to the alignment unit 112. The alignment unit 112 performs alignment of the image data of the input target domain. Here, the "alignment" means that the image data are converted so as to match an angle or a direction of a line of sight of capturing with respect to an object included in the image data to a predetermined reference angle or a predetermined reference direction. For instance, when the reference angle is a front angle of the object, the alignment unit 112 converts the input image data into image data viewed from the front angle. Even when image data, which are obtained by capturing an object from various directions such as an oblique upward direction, an oblique downward direction, a left direction and a right direction, are input, the alignment unit 112 converts images into image data of the front angle. Note that the alignment unit 112 will be described in detail later. The alignment unit 112 outputs the image data of the target domain after the conversion to the feature extraction units 113 and 114.

Each of the feature extraction units 113 and 114 performs a feature extraction with respect to the input image data of the target domain, and outputs the extracted features to the local feature extraction unit 115. Each of the feature extraction units 113 and 114 are formed by a neural network such as a CNN (Convolutional Neural Network) or the like. Different parameters are set to the CNN forming each of the feature extraction units 113 and 114, and the features are extracted from input images based on the individual parameters. The CNN forming each of the feature extraction units 113 and 114 forms a Bilinear CNN.

The local feature extraction unit 115 calculates respective correlations between the features output from the feature extraction unit 113 and the features output from the feature extraction unit 114, and outputs results to the feature discrimination unit 131 and the domain adaptation unit 132 as the local features.

On the other hand, a process of the source domain data obtained from the source domain DB 3 is basically the same as the process for the target domain data described above. That is, the source domain data acquisition unit 121 acquires the image data of the source domain from the source domain DB 3, and outputs the image data to the alignment unit 122. The alignment unit 122 performs an alignment for converting the input image data into image data of the reference angle, and outputs a result to the feature extraction units 123 and 124.

Each of the feature extraction units 123 and 124 is formed by the neural network having the same configuration as those of the feature extraction units 113 and 114, and shares parameters with each other. Specifically, the same parameters are set in the neural network forming each of the feature extraction units 113 and 123, and the same parameters are set in the neural network forming each of the feature extraction units 114 and 124. Each of feature extraction units 123 and 124 performs the feature extraction from the aligned image data, and outputs to the local feature extraction unit 125. The local feature extraction unit 125 generates the local features by calculating the respective correlations between the features extracted by the feature extraction unit 123 and the features extracted by the feature extraction unit 124, and outputs the local features to the feature discrimination unit 131 and the domain adaptation unit 132.

For each piece of the target domain data, the feature discrimination unit 131 performs a class classification based on the extracted the local features, and calculates an error by comparing a discrimination result with a correct answer label corresponding to the target domain data. Next, the feature discrimination unit 116 optimizes the parameters of the neural networks forming the feature extraction units 113 and 114 so as to minimize the calculated error. The optimized parameters are shared with the feature extraction units 123 and 124. Note that in a case where the local feature extraction unit 115 is formed by the neural network or the like, the feature discrimination unit 116 optimizes the parameters of the neural network forming the local feature extraction unit 115 at the same time.

The domain adaptation unit 132 optimizes the parameters of the neural networks forming the feature extraction units 123 and 124 so as to approach feature data distributions of data respectively derived from two domains based on the local features of the image data in respective domains, which are input from the local feature extraction units 115 and 125. The optimized parameters are shared with the feature extraction units 113 and 114. In a case where the local feature extraction unit 125 is formed by the neural network or the like, the domain adaptation unit 132 optimizes the parameters of the neural network forming the local feature extraction unit 125 at the same time. Accordingly, the parameters of the feature extraction units 113, 114, 123, and 124 are optimized so that the class classification by the feature discrimination unit 131 is correctly performed and respective feature data distributions of the data of the two domains are approached to each other.

Next, the training by the learning device 100 is terminated when a predetermined learning end condition is satisfied, and the parameters of the feature extraction units 113 and 114 at that time are obtained as the parameters of the trained detailed classification model.

US 12,573,181 B2

7

(Alignment Unit)

Next, the alignment unit will be described in detail. FIG. 4 is a block diagram illustrating a configuration at a time of training of the alignment unit 112. The alignment unit 112 includes a conversion parameter estimation unit 143 and a conversion section 144. The alignment unit 112 is trained using the source domain data. In the example of a car type classification described above, the CG domain, which can provide a wealth of images, is used as the source domain.

First, an image group (hereinafter also referred to as a "specific class image group") 141 rendered under various conditions for a specific class is generated based on the image data of the source domain which is the CG domain. A specific class indicates a specific car type in the example of the car type classification described above. As the specific class image group 141, images are generated in which an angle for viewing an object in an original image of the specific class, that is, an angle of a line of sight viewing the object from a viewpoint (hereinafter, referred to as a "line-of-sight angle") or a direction viewing the object (hereinafter, referred to as a "line-of-sight direction") is variously changed. In this example embodiment, since the CG domain is used as the source domain, the GC image can be rendered to produce an image at any line-of-sight angle.

Moreover, the specific class image group 141 may generate an image in which a distance between the viewpoint and the object in an original image, that is, the distance in a depth direction of the object in the image is changed. In addition, an image in which the position of the object in the original image is shifted in a vertical direction, a horizontal direction, an oblique direction, or the like within an area of the image may be generated. In addition, various perturbations may be added to the original image to generate images. In this case, one or more of the following perturbations can be used, for instance, adding or changing color of an object in an image, adding or changing a pattern of the object, adding illumination to the object, adding a background of the object in the image, adding noise, and the like.

Based on the image data of the source domain, a reference image of the specific class (hereinafter referred to as a "specific class reference image") 142 is generated. The specific class reference image is an image of a predetermined reference line-of-sight angle (hereinafter, referred to as a "reference angle") or a reference line-of-sight direction (hereinafter, referred to as a "reference direction") for an object of a specific class, that is, the same class as the specific class image group 141. In the above-described example of the car type classification, it is assumed that the reference angle is the front angle of the car, the specific class reference image is an image of the front angle of the car of the car type corresponding to the specific class. Note that the reference angle is determined based on a location or a portion of the object to focus on when performing the detailed classification. For instance, in a case where features of the object to be subjected to the detailed classification are on a side or a rear, the specific class reference image is an image in which the object is viewed from the side or the rear. The specific class image group 141 and the specific class reference image 142 thus obtained are used as the training data for training of the conversion parameter estimation unit 143.

The conversion parameter estimation unit 143 estimates parameters for transforming images of various line-of-sight angles into the image of reference angle. The conversion parameter estimation unit 143 can be formed by, for instance, the neural network which performs an affine transformation for projecting images of various angles to the image of the reference angle such as the front angle. The conversion parameter estimation unit 143 uses the specific class image group 141 described above as input data, and is trained using the specific class reference image 142 as the correct answer label. The trained conversion parameter estimation unit 143 can output conversion parameters for converting each of images which are captured from various angles, have various colors and patterns, and include various backgrounds and noises, into the image of the reference angle.

The conversion parameters estimated by the conversion parameter estimation unit 143 are set in the conversion section 144 such as a projective converter. Accordingly, it is possible to acquire the alignment unit 112 capable of converting the images of various line-of-sight angles into the image of the reference angle.

During an actual operation, when the image data are input to the alignment unit 112, the conversion parameter estimation unit 143 calculates the conversion parameters for converting the input image into the image of the reference angle, and sets the calculated conversion parameters to the conversion section 144. The conversion section 144 performs a projective conversion to the input image based on the set conversion parameters, and outputs the converted image to the feature extraction units 113 and 114 as the aligned image. That is, the conversion parameter estimation unit 143 estimates the conversion parameters for each input image, and sets the obtained conversion parameters to the conversion section 144.

The alignment unit 122 is formed similarly to the alignment unit 112. That is, the conversion parameter estimation unit 143 and the conversion section 144 trained by the learning method described above can be used as the alignment units 112 and 122.

By applying the alignment unit 112 to the target domain being the real image domain, it is possible to obtain an image converted into the reference angle even in the real image domain. In particular, since a certain domain adaptation effect can be obtained by applying the various perturbations to image data in the CG domain as described above to generate the specific class image group 141 and by training the conversion parameter estimation unit 143, even in a case where the alignment unit 112 is applied to the real image domain, it is possible to acquire the conversion section 144 with a sufficient performance to carry out the class classification.

It is noted that the alignment of the image needs a process of returning to a two-dimensional image after estimating a three-dimensional structure of the object and carrying out a three-dimensional rigid body transformation (rotational and translational transformation). However, in a case where the assumption is that the angle variation is equal to or less than a constant such as in the front image of the car, the projective conversion can be used approximately as described above instead of the three-dimensional rigid body transformation. By this projective conversion, it is possible to simplify the training of the conversion parameter estimation unit 143. In particular, since the CNN has some degree of positional invariance, it is considered that the conversion does not need to be strictly performed.

Figure 5:
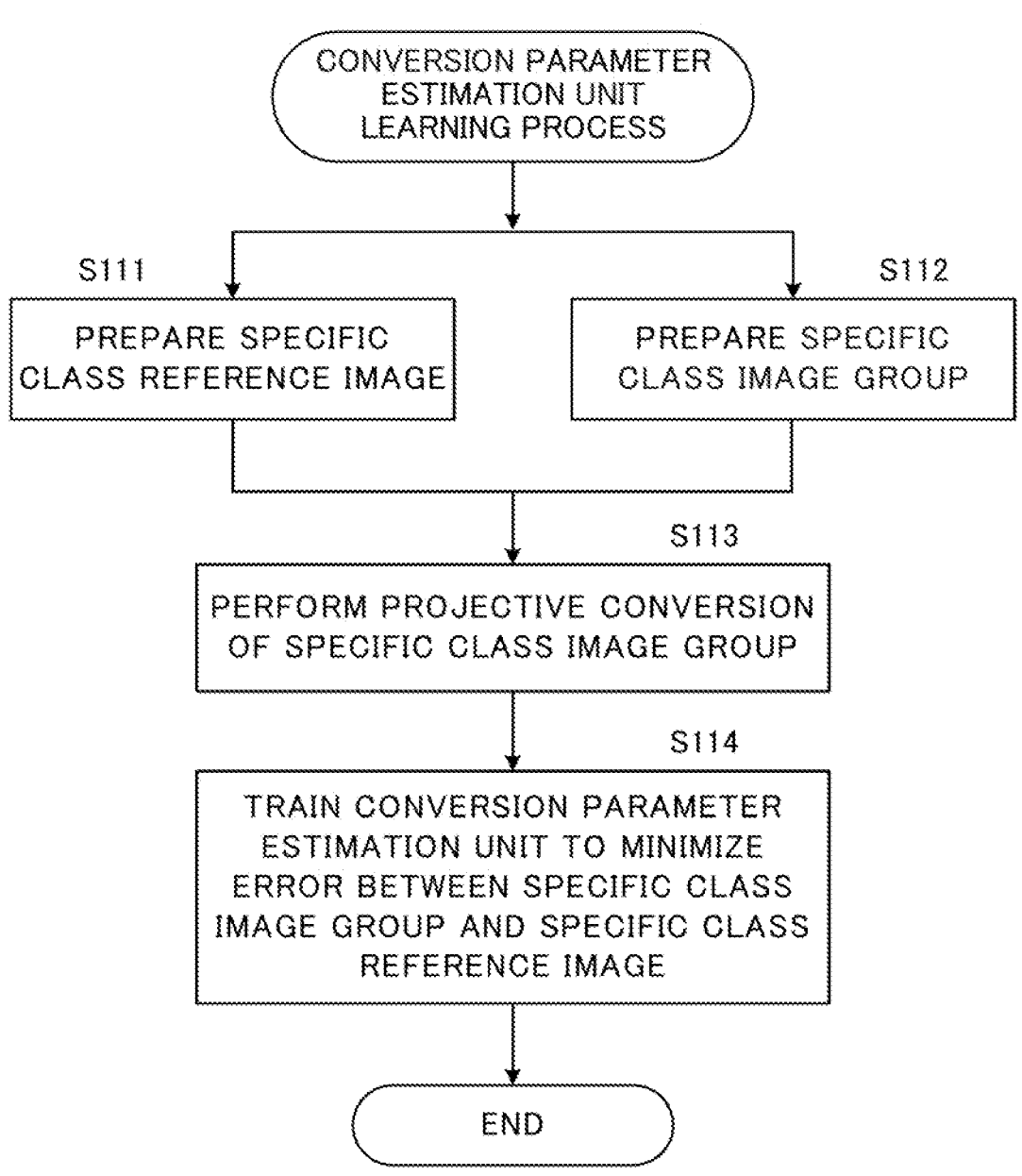
FIG. 5 is a flowchart of a learning process of a conversion parameter estimation unit.

Next, the learning process of the conversion parameter estimation unit 143 will be described. FIG. 5 is a flowchart of the learning process performed by the conversion parameter estimation unit 143. First, as preparation for the training data, specific class reference image is prepared using image data of the source domain which is the CG domain (step S111), and the specific class image group 141 is further prepared (step S112). Next, the conversion parameter estimation unit 143 performs the projective conversion with respect to the specific class image group 141 (step S113). Subsequently, the conversion parameter estimation unit 143 is trained to minimize the error between the specific class image group 141 and the specific class reference image 142 after the projective conversion (step S114). Specifically, the parameters of the neural network forming the conversion parameter estimation unit 143 are updated so as to minimize the above-described error. After that when a predetermined end condition is provided, the learning process of the conversion parameter estimation unit 143 is terminated. Accordingly, it becomes possible for the conversion parameter estimation unit 143 to estimate the parameters for converting the input images of various line-of-sight angles into the image of the reference angle.

In the example in FIG. 4, although the alignment units 112 and 122 are formed by the conversion parameter estimation unit 143 and the conversion section 144, instead, it may be formed as one neural network for performing the projective conversion. In this case, one of the neural networks calculates appropriate conversion parameters for the input image, and generates and outputs the image to which the projective conversion is performed using the conversion parameters.

(Learning Process of Detailed Classification Model)

Figure 6:
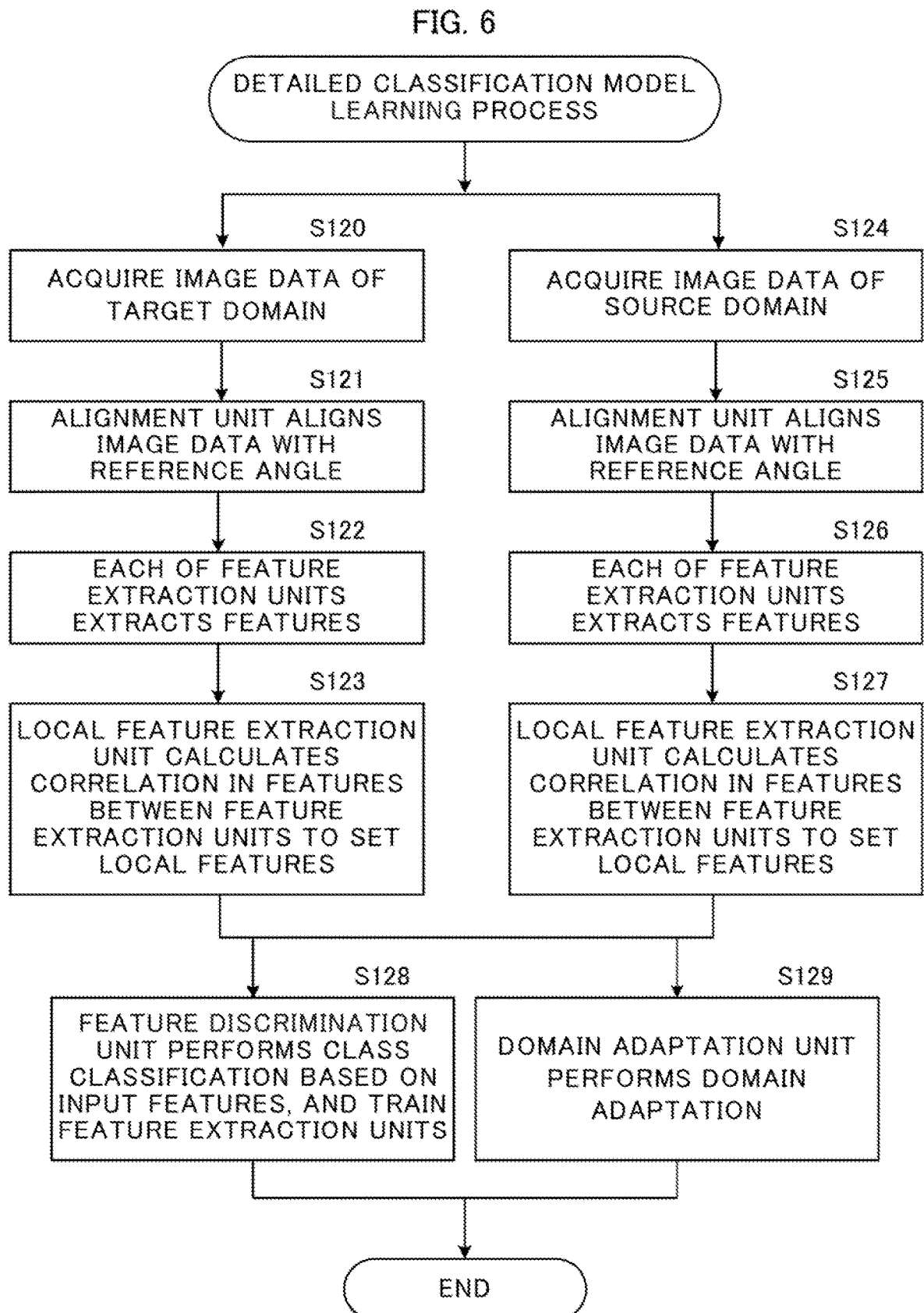
FIG. 6 is a flowchart of a learning process of a detailed classification model.

Next, the learning process of the detailed classification model by the learning device 100 will be described. FIG. 6 is a flowchart of the learning process of the detailed classification model. This learning process is realized by the processor 12 depicted in FIG. 2, which executes a program prepared in advance and operates as each of elements depicted in FIG. 3.

First, the target domain data acquisition unit 111 acquires the image data of the target domain from the target domain DB 2 (step S120), and the alignment unit 112 aligns the input image data to the reference angle (step S121). In detail, the alignment unit 112 converts the input image data into the image data of the reference angle, and outputs the image data to the feature extraction units 113 and 114.

Next, each of the feature extraction units 113 and 114 extracts features from the input image data, and outputs the features to the local feature extraction unit 115 (step S122). The local feature extraction unit 115 calculates respective correlations between the features input from the feature extraction unit 113 and the features input from the feature extraction unit 114, and outputs the correlations to the feature discrimination unit 131 and the domain adaptation unit 132 as the local features (step S123).

Similarly, the source domain data acquisition unit 121 acquires the image data of the source domain from the source domain DB 3 (step S124), and the alignment unit 122 aligns the input image data to the reference angle (step S125). Specifically, the alignment unit 122 converts the input image data into the image data of the reference angle, and outputs the image data to the feature extraction units 123 and 124.

Next, each of the feature extraction units 123 and 124 extracts features from the input image data of the source domain, and outputs the extracted features to the local feature extraction unit 125 (step S126). The local feature extraction unit 125 calculates respective correlations between the features input from the feature extraction unit 123 and the features input from the feature extraction unit 124, and outputs the correlations to the feature discrimination unit 131 and the domain adaptation unit 132 as the local features (step S127).

Next, the feature discrimination unit 131 classifies the image data based on the local features input from the local feature extraction units 115 and 125, and trains the feature extraction units 113 and 114 based on the error between the classification result and the correct answer label (step S128). Specifically, the feature discrimination unit 131 updates the parameters of the neural network forming each of the feature extraction units 113 and 114 so as to minimize an error between the classification result and the correct answer label.

Moreover, the domain adaptation unit 132 performs the domain adaptation based on the local features input from the local feature extraction units 115 and 125 (step S129). In detail, the domain adaptation unit 132 updates the parameters of the neural network forming each of the feature extraction units 123 and 124 so that the local features extracted from the target domain data and the local features extracted from source domain data are closer for the same class, and the local features extracted from the target domain data and the local features extracted from source domain data are farther apart for different classes. Then, the learning process is terminated when the predetermined learning end condition is provided.

[Inference Device]

Figure 7:
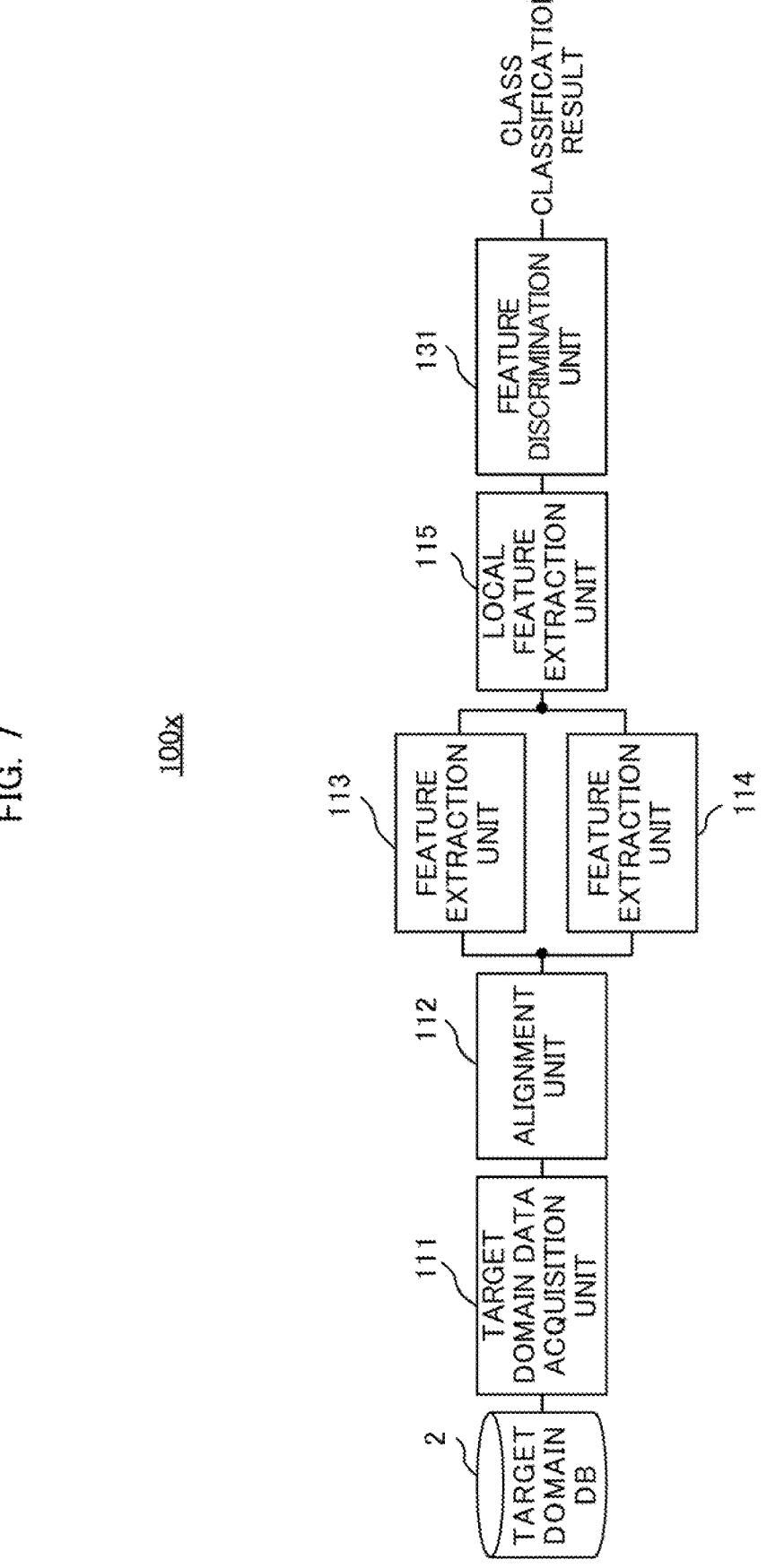
FIG. 7 is a block diagram illustrating a functional configuration of a classification section according to the first example embodiment.

Next, a classification section which corresponds to an inference device using a trained detailed classification model will be described. FIG. 7 is a block diagram illustrating a functional configuration of the classification section according to the first example embodiment. The hardware configuration of the classification section is the same as that depicted in FIG. 2.

A classification section 100x includes the target domain data acquisition unit 111, the alignment unit 112, the feature extraction units 113 and 114, the local feature extraction unit 115, and the feature discrimination unit 131. Each of these components is basically formed in the same manner as FIG. 3. However, each of the feature extraction units 113 and 114 use the neural network which has already been trained through the learning process described above.

The classification section 100x acquires the image data of the target domain, and performs the detailed classification. In detail, the target domain data acquisition unit 111 acquires the image data from the target domain DB 2, and outputs the acquired image data to the alignment unit 112. The alignment unit 112 performs the alignment of the input image data, and outputs the image data of the reference angle to the feature extraction units 113 and 114. The feature extraction units 113 and 114 extract features from the input image data, and output the features to the local feature extraction unit 115. The local feature extraction unit 115 generates local features by calculating respective correlations between the features input from the feature extraction unit 113 and the features input from the feature extraction unit 114, and outputs the local features to the feature discrimination unit 131. The feature discrimination unit 131 performs the class classification of the image data based on the input local features, and outputs a class classification result.

Second Example Embodiment

In the first example embodiment described above, the alignment units 112 and 122 perform the alignment with respect to the image data. In contrast, in a second example embodiment, each of alignment units performs an alignment for the local features extracted from image data. Since an overall configuration and a hardware configuration of a learning device 200 according to the second example embodiment are the same as the overall configuration and the hardware configuration of that according to the first example embodiment depicted in FIG. 1 and FIG. 2, the explanations thereof will be omitted.

(Functional Configuration)

Figure 8:
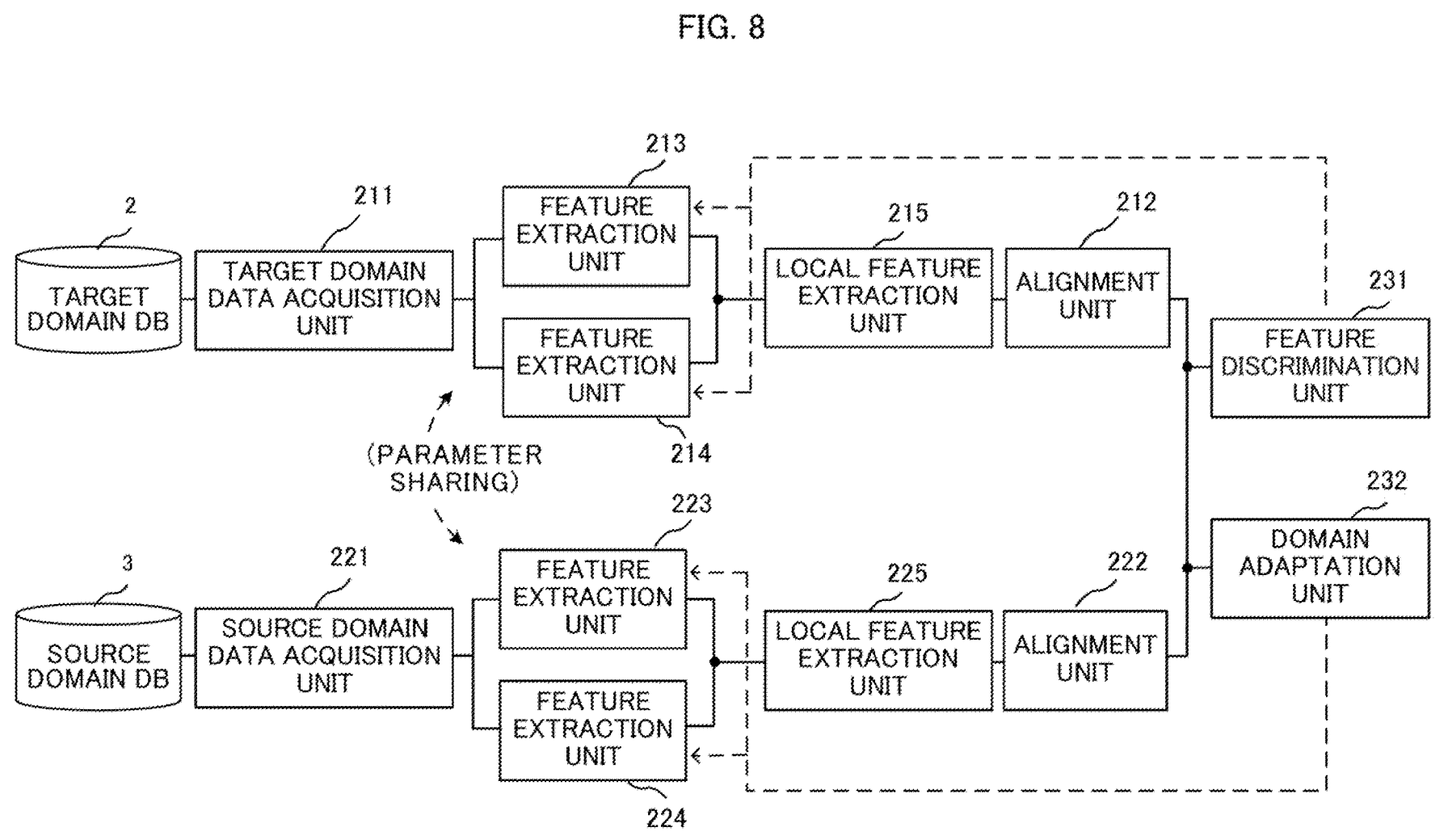

FIG. 8 is a block diagram illustrating a functional configuration of the learning device 200 according to the second example embodiment. As illustrated, the learning device 200 includes a target domain data acquisition unit 211, a source domain data acquisition unit 221, feature extraction units 213, 214, 223, and 224, local feature extraction units 215 and 225, alignment units 212 and 222, a feature discrimination unit 231, and a domain adaptation unit 232.

As can be understood by comparing with FIG. 3, in a second example embodiment, the alignment sections 212 and 222 are arranged at a rear of the local feature extraction sections 215 and 225. Therefore, in the learning device 200, the alignment unit 212 performs the alignment in which the local features extracted by the local feature extraction unit 215 are converted into the local features of the reference angle. In the same manner, the alignment unit 222 performs the alignment in which the local features extracted by the local feature extraction unit 225 are converted into the local features of the reference angle. Other than this point, each of elements of the learning device 200 according to the second example embodiment is the same as a corresponding element of the learning device 100 according to the first example embodiment.

(Alignment Unit)

Figure 9:
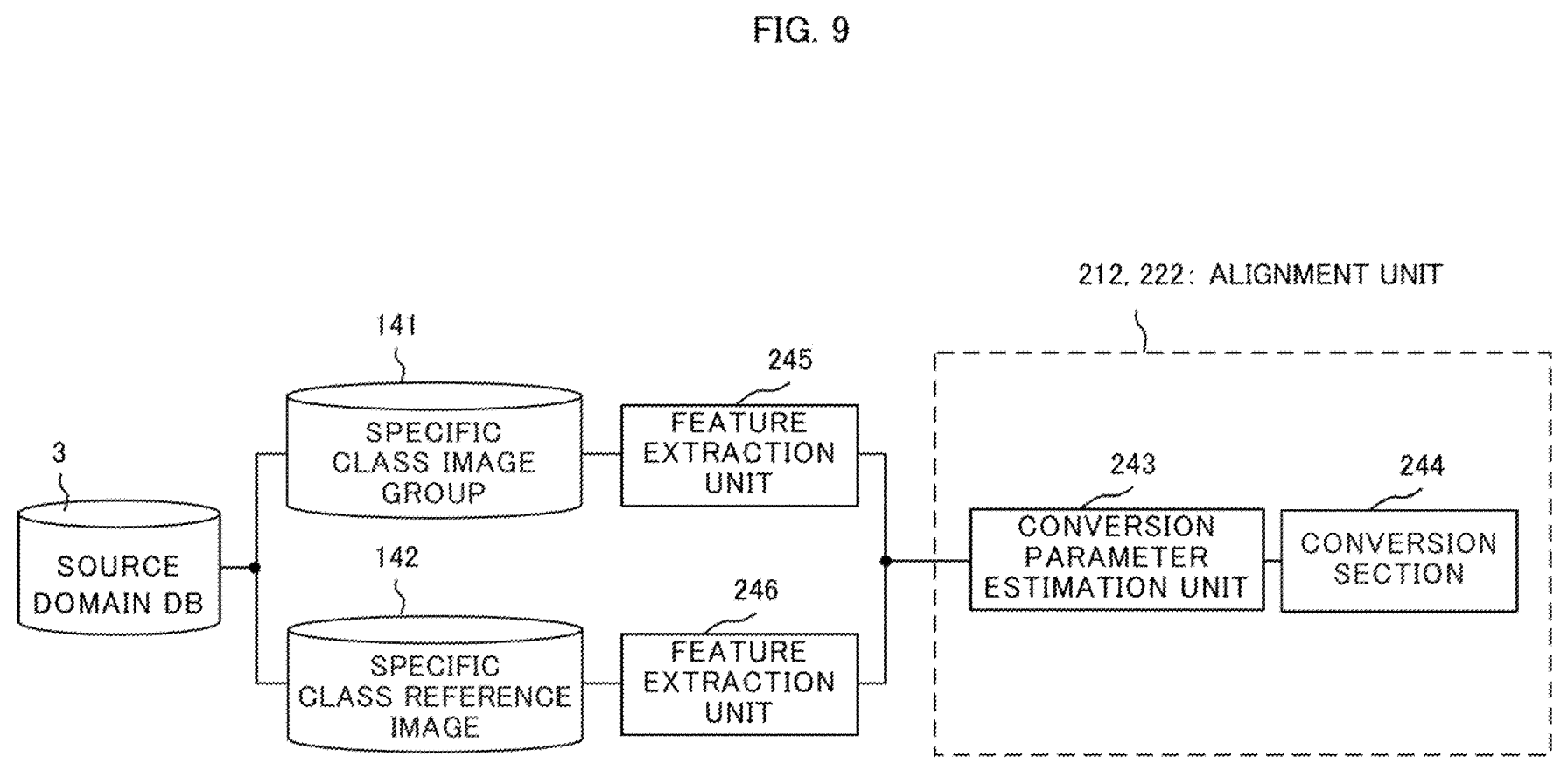

Next, the alignment unit will be described in detail. FIG. 9 is a block diagram illustrating a configuration of the alignment unit 212 at a time of learning. The alignment unit 212 includes a conversion parameter estimation unit 243 and a conversion section 244. The alignment unit 212 is trained using the source domain data.

As can be understood by comparing with FIG. 4, the configuration at a time of learning of the alignment section 212 of the second example embodiment includes feature extraction units 245 and 246, in addition to the configuration at the time of learning of the alignment section 112 of the first example embodiment. The feature extraction units 245 and 246 are formed by, for instance, the Bilinear CNN or the like, and have been trained in advance using data of the CG domain which is the source domain. Thus, each of the feature extraction units 245 and 246 is formed as a network which carries out the feature extraction for focusing on the local features and performing the class classification in the CG domain.

In the second example embodiment, the specific class image group 141 and the specific class reference image 142 are prepared as the training data for training of the conversion parameter estimation unit 243 forming the alignment unit 212. The specific class image group 141 is input to the feature extraction unit 245, and the specific class reference image 142 is input to the feature extraction unit 246. The feature extraction unit 245 performs the feature extraction with respect to each image in the input specific class image group 141, and outputs the extracted features to the conversion parameter estimation unit 243. The feature extraction unit 246 performs feature extraction from the input specific class reference image 142, and outputs the extracted feature to the conversion parameter estimation unit 243.

The conversion parameter estimation unit 243 estimates the parameters for converting images of various line-of-sight angles into the image of the reference angle. The conversion parameter estimation unit 243 may be formed by, for instance, the neural network which performs the affine transformation for projecting the features of each image at various angles to the features of the image at the reference angle such as the front angle or the like. Here, in the second example embodiment, the conversion parameter estimation unit 243 uses the features extracted from the specific class image group 141 described above as the input data, and is trained by using the features extracted from the specific class reference image 142 as the correct answer label. The trained conversion parameter estimation unit 243 can output conversion parameters for converting the features derived from the image obtained by various renderings into the features derived from the image of the reference angle.

The conversion parameters estimated by the conversion parameter estimation unit 243 are set in the conversion section 244 such as the projective conversion. Therefore, it is possible to acquire the alignment unit 212 which is capable of converting the features extracted from the various images into the features derived from the image of the reference angle. Note that the same alignment unit 212 is used as the alignment unit 222.

Note that in an actual operation, when the local features are input from the local feature extraction unit 215 to the alignment unit 212, the conversion parameter estimation unit 243 calculates the conversion parameters for converting the input local features into the features derived from the image of the reference angle, and sets the conversion parameters in the conversion section 244. The conversion section 244 performs the projective conversion to the input local features based on the conversion parameters being set, and outputs the converted local features to the feature discrimination unit 231 and the domain adaptation unit 232. That is, the conversion parameter estimation unit 243 estimates the conversion parameters for the local features of each input, and sets the acquired conversion parameters in the conversion section 244. Note that the alignment unit 222 operates in the same manner.

Figure 10:
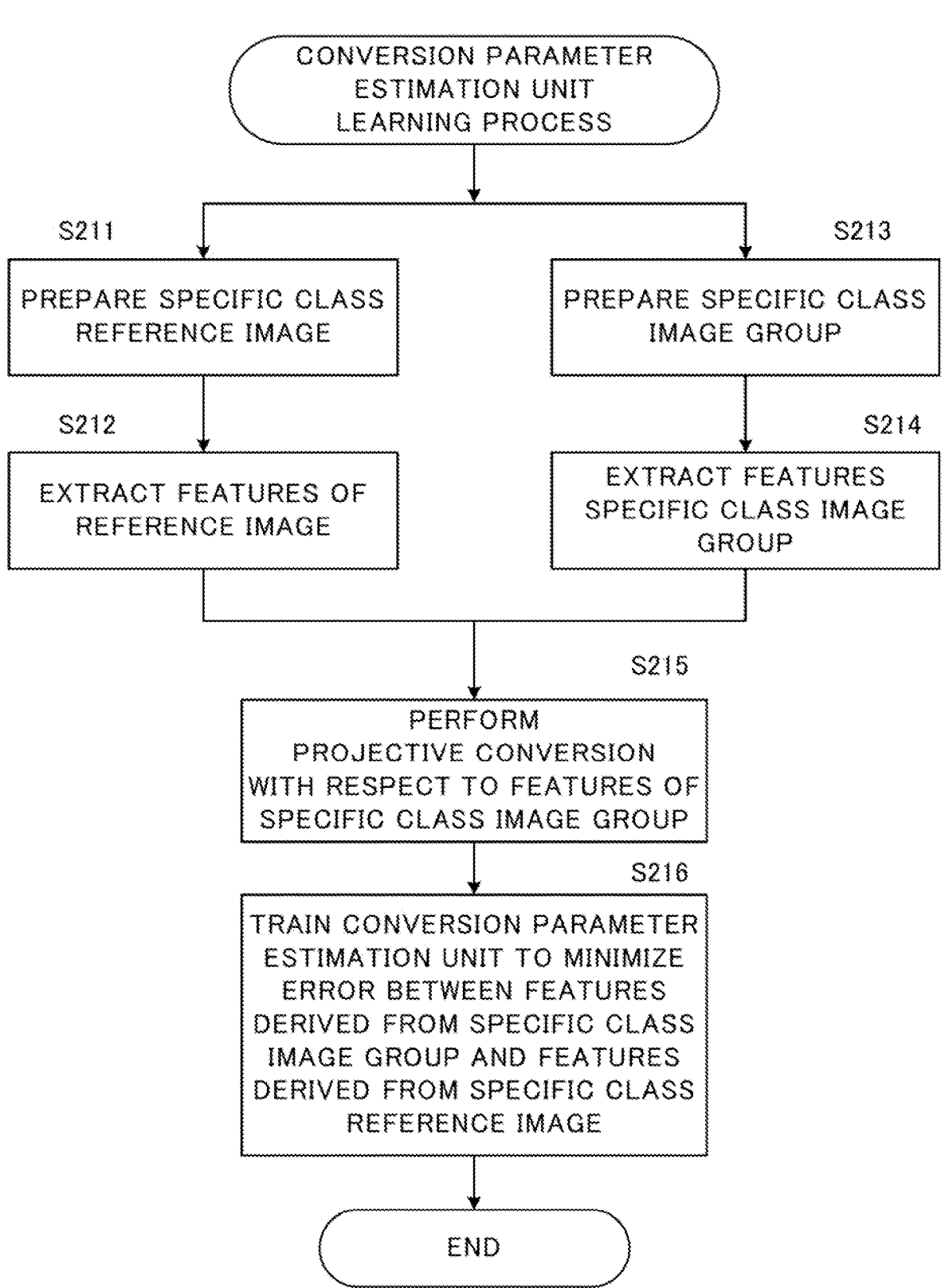
FIG. 10 is a flowchart of a learning process of a conversion parameter estimation unit.

Next, the learning process for the conversion parameter estimation unit 243 will be described. FIG. 10 is a flowchart of the learning process for the conversion parameter estimation unit. First, as preparation for the training data, the specific class reference image 142 is prepared using the image data of the source domain which is the CG domain (step S211). The feature extraction unit 246 extracts features from the specific class reference image 142, and outputs the extracted features to the conversion parameter estimation unit 243 (step S212). Moreover, the specific class image group 141 is prepared using the image data of the source domain (step S213). The feature extraction unit 246 extracts the features from the specific class image group 141, and outputs the extracted features to the conversion parameter estimation unit 243 (step S214).

Next, the conversion parameter estimation unit 243 performs the projective conversion with respect to the features derived from the specific class image group 141 (step S215). Next, the conversion parameter estimation unit 243 is trained to minimize the error between the features derived from the specific class image group 141 to which the projective conversion has been performed and the features derived from the specific class reference image 142 (step S216). In detail, the parameters of the neural network forming the conversion parameter estimation unit 243 are updated so as to minimize the error described above. Next, in a case where the predetermined end condition is provided, the learning process for the conversion parameter estimation unit 243 is terminated. Accordingly, the conversion parameter estimation unit 243 can estimate the parameters for converting the features derived from the input images of various line-of-sight angles into the features derived from the image of reference angle.

In an example in FIG. 9, each of the alignment units 212 and 222 is formed by the conversion parameter estimation unit 243 and the conversion section 244, but instead, the alignment units 212 and 222 may be formed as one neural network for performing the projective conversion. In this case, the one neural network calculates appropriate conversion parameters for the input local features, and generates and outputs the local features after the projective conversion using the conversion parameters.

(Learning Process of Detailed Classification Model)

Figure 11:
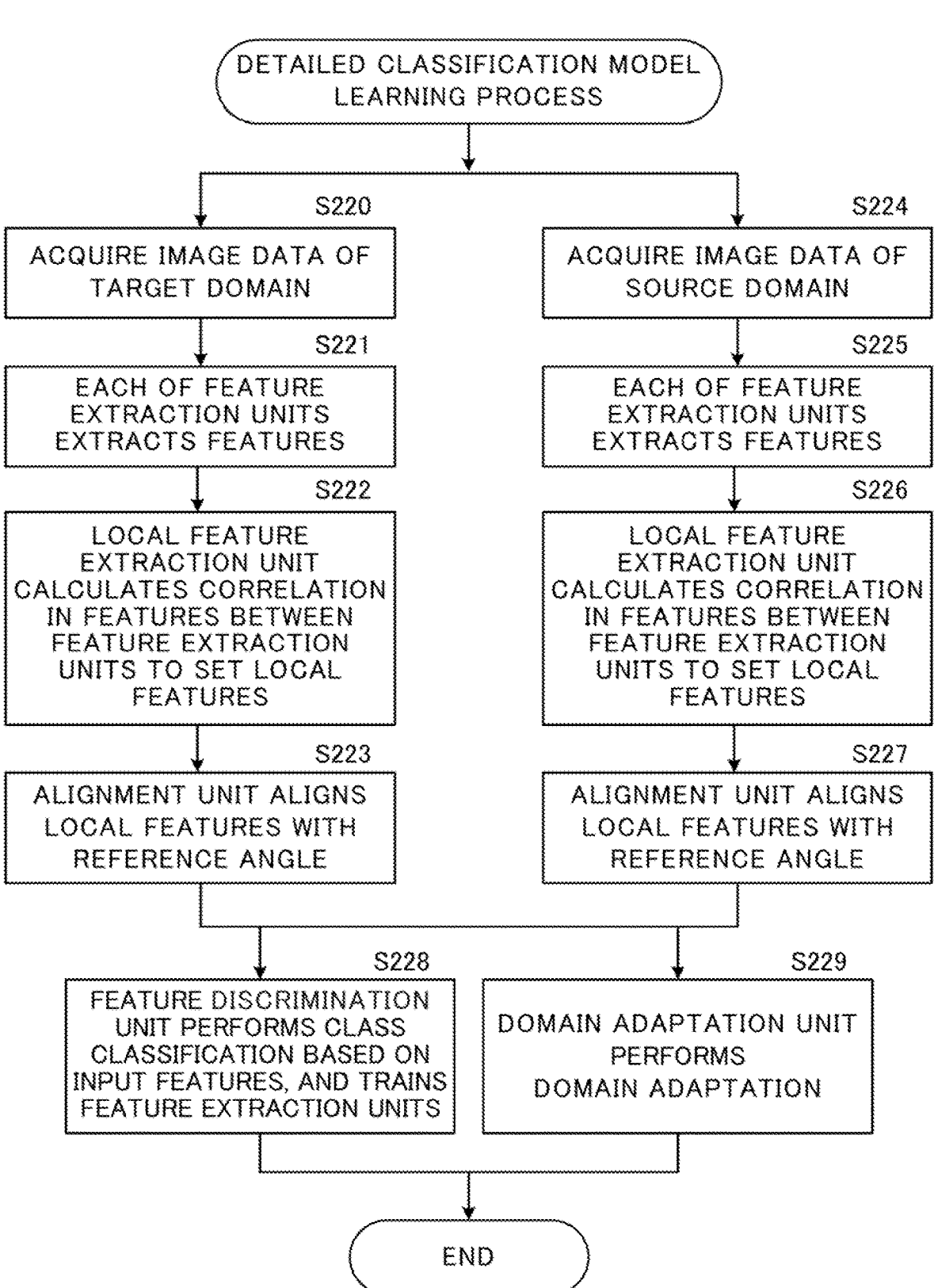
FIG. 11 is a flowchart of a learning process of a detailed classification model.

Next, the learning process performed by the learning device 200 of the detailed classification model will be described. FIG. 11 is a flowchart of the learning process of the detailed classification model. This learning process is realized by the processor 12 depicted in FIG. 2 which executes a program prepared in advance and operates as each of elements depicted in FIG. 8.

First, the target domain data acquisition unit 211 acquires the image data of the target domain from the target domain DB 2, and outputs to the feature extraction units 213 and 214 (step S220). Each of the feature extraction units 213 and 214 extracts features from the input image data of the target domain, and output the extracted features to the local feature extraction unit 215 (step S221). The local feature extraction unit 215 calculates respective correlations between the features input from the feature extraction unit 213 and the features input from the feature extraction unit 214, and outputs the correlations to the alignment unit 212 as the local features (step S222). The alignment unit 212 aligns the input local features to the reference angle (step S223). In detail, the alignment unit 212 converts the input local features into local features derived from the image of the reference angle, and outputs the acquired local features to the feature discrimination unit 231 and the domain adaptation unit 232.

Similarly, the source domain data acquisition unit 221 acquires the image data of the source domain from the source domain DB 3, and outputs the acquired image data to the feature extraction units 223 and 223 (step S224). Each of the feature extraction units 223 and 224 extracts features from the input image data of the source domain, and outputs the extracted features to the local feature extraction unit 225 (step S225). The local feature extraction unit 225 calculates respective correlations between the features input from the feature extraction unit 223 and the features input from the feature extraction unit 224, and outputs the correlations to the alignment unit 222 as the local features (step S226). The alignment unit 222 aligns the input local features to the reference angle (step S227). Specifically, the alignment unit 222 converts the input local features into the local features derived from the image of the reference angle, and outputs the input local features to the feature discrimination unit 231 and the domain adaptation unit 232.

Next, the feature discrimination unit 231 classifies the image data based on the local features input from the alignment units 212 and 222, and trains the feature extraction units 213 and 214 based on the error between the classification result and the correct answer label (step S228). Specifically, the feature discrimination unit 231 updates the parameters of the neural networks forming the feature extraction units 213 and 214 so as to minimize the error between the classification result and the correct answer label.

Moreover, the domain adaptation unit 232 performs the domain adaptation based on the local features input from the alignment units 212 and 222 (step S229). In detail, the domain adaptation unit 232 updates the parameters of the neural networks forming the feature extraction units 223 and 224 so that the local features extracted from the target domain data and the local features extracted from the source domain data are closer for the same class, and the target domain data and the local features extracted from the source domain data are farther apart for different classes. After that, the learning process is terminated when the predetermined learning end condition is provided.

[Inference Device]

Figure 12:
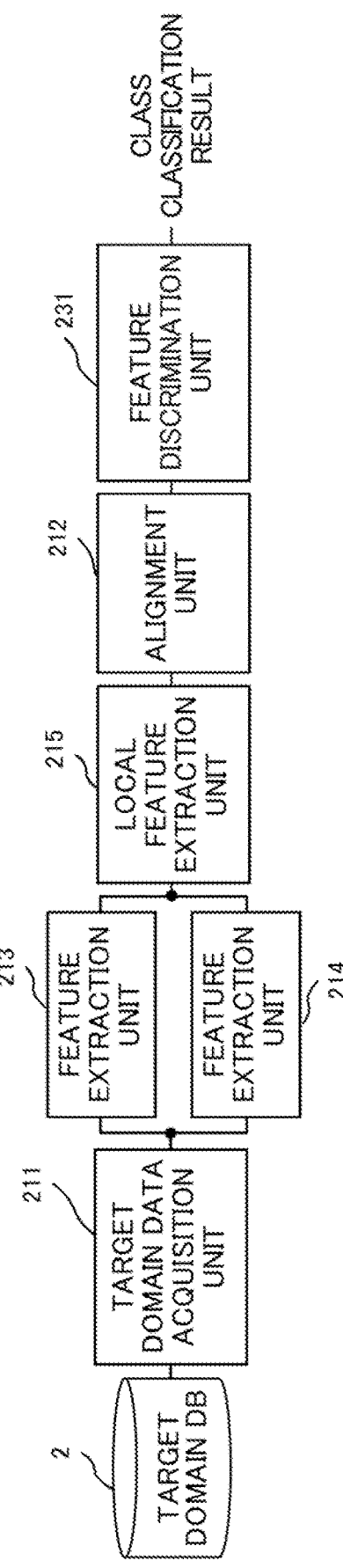
FIG. 12 is a block diagram illustrating a functional configuration of a classification section according to the second example embodiment.

Next, a classification section which is an inference device using a trained detailed classification model will be described. FIG. 12 is a block diagram illustrating a functional configuration of the classification section according to the second example embodiment. A hardware configuration of the classification section is the same as that depicted in FIG. 2.

A classification section 200x includes the target domain data acquisition unit 211, the feature extraction units 213 and 214, the local feature extraction unit 215, the alignment unit 212, and the feature discrimination unit 231. Each of these elements is basically formed in the same manner as in FIG. 8. However, each of the feature extraction units 213 and 214 uses the neural network which has already been trained through the learning process described above.

The classification section 200x acquires the image data of the target domain, and performs the detailed classification. Specifically, the target domain data acquisition unit 211 acquires the image data from the target domain DB 2, and outputs the image data to the feature extraction units 213 and 214. Each of the feature extraction units 213 and 214 extracts features from the input image data, and outputs the extracted features to the local feature extraction unit 215. The local feature extraction unit 215 calculates respective correlations between the features input from the feature extraction unit 213 and the features input from the feature extraction unit 214 to generate the local features, and outputs the local features to the alignment unit 212. The alignment unit 212 converts the input local feature into the local features derived from the image of the reference angle, and outputs the local features to the feature discrimination unit 231. The feature discrimination unit 231 performs the class classification of the image data based on the input local features, and outputs the class classification result.

Third Example Embodiment

Figure 13:
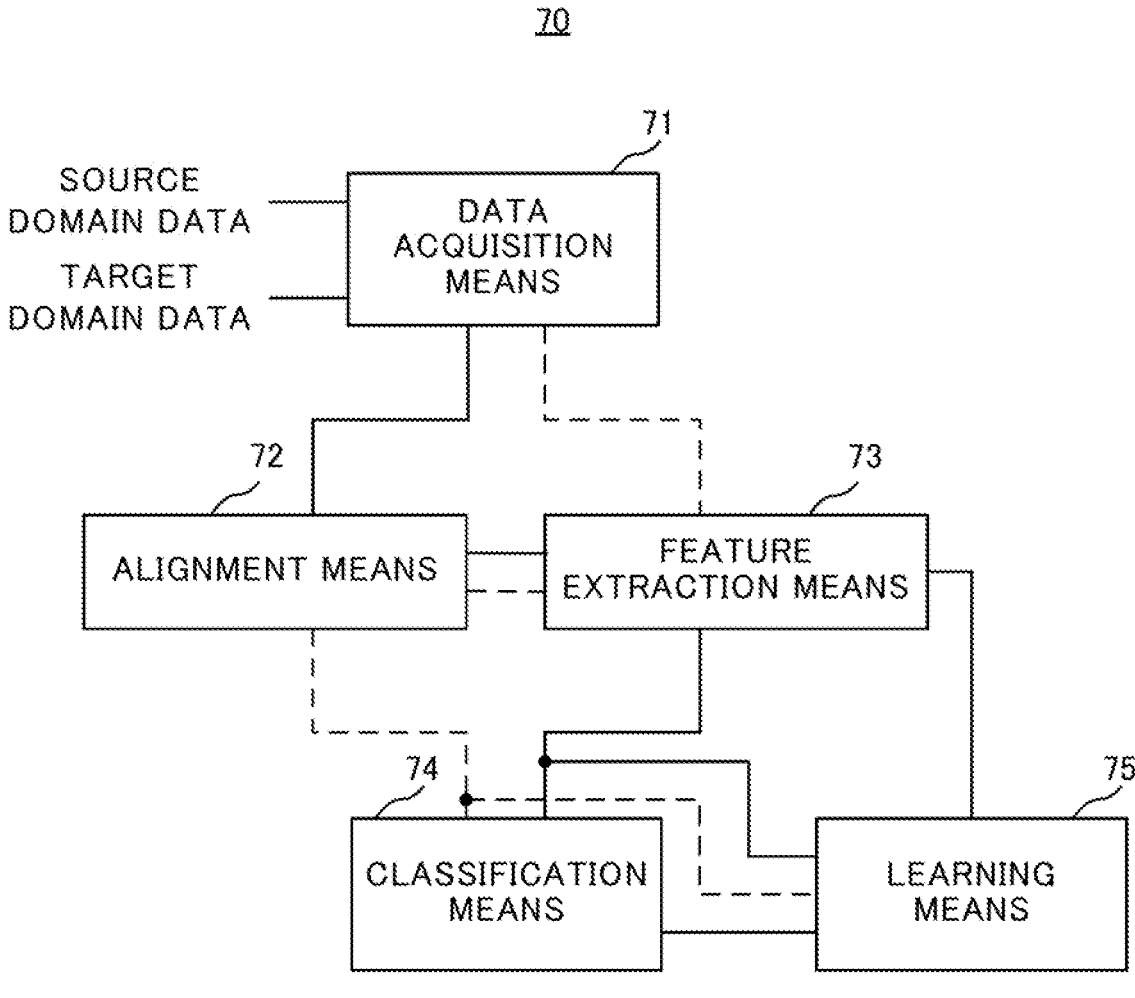
FIG. 13 is a block diagram illustrating a functional configuration of a learning device according to a third example embodiment.

Next, a third example embodiment of the present invention will be described. FIG. 13 is a block diagram illustrating a functional configuration of a learning device 70 according to the third example embodiment. The learning device 70 includes a data acquisition means 71, an alignment means 72, a feature extraction means 73, a classification means 74, and a learning means 75.

The data acquisition means 71 acquires the source domain data and the target domain data. The alignment means 72 performs alignment for converting the source domain data and the target domain data into an image of a predetermined reference angle. The feature extraction means 73 extracts local features of the source domain data and the target domain data. Note that either of the alignment by the alignment means 72 or the extraction of the local features by the feature extraction means 73 may be first carried out. In other words, the feature extraction means 73 may extract the local features from data aligned by the alignment means 72, and the alignment means 72 may perform the alignment with respect to the local features extracted by the feature extraction means 73.

The classification means 74 classifies a class based on the local features of the source domain data and the target domain data after the alignment. The learning means 75 trains the feature extraction means based on the local features of the source domain data and the target domain data after the alignment and the classification result for the class.

Figure 14:
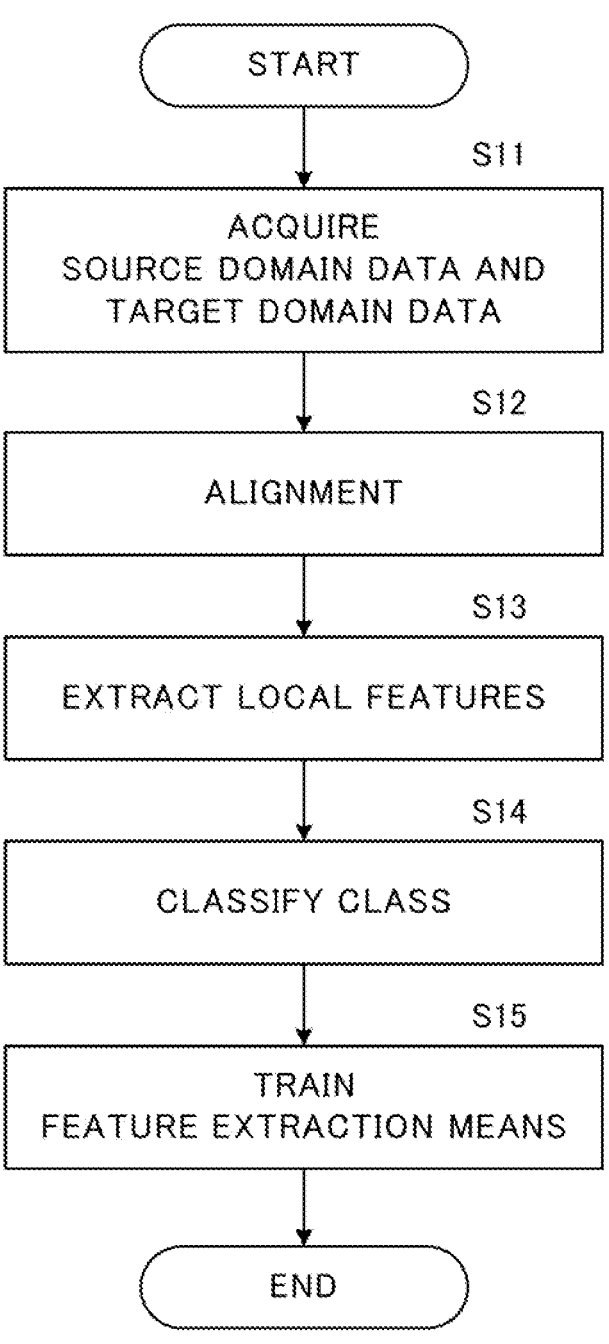
FIG. 14 is a flowchart of a learning process according to the third example embodiment.

FIG. 14 is a flowchart of a learning process according to the third example embodiment. This learning process is executed by the learning device 70 depicted in FIG. 13. In detail, the data acquisition means 71 acquires the source domain data and the target domain data (step S11). The alignment means 72 performs the alignment for converting the source domain data and the target domain data into respective images of predetermined reference angle (step S12). The feature extraction means 73 extracts the local features of the source domain data and the target domain data (step S13). The order of steps S12 and S13 may be reversed. The classification means 74 classifies the class based on the local features of the source domain data and the target domain data after the alignment (step S14). The learning means 75 trains the feature extraction means based on the local features of the source domain data and the target domain data after the alignment and the classification result of the class (step S15).

A part or all of the example embodiments described above may also be described as the following supplementary notes, but not limited thereto.

(Supplementary Note 1)

A learning device comprising:

a data acquisition means configured to acquire source domain data and target domain data;

an alignment means configured to perform an alignment which converts the source domain data and the target domain data into images of a predetermined reference angle;

a feature extraction means configured to extract local features of the source domain data and the target domain data;

a classification means configured to classify a class based on the local features of the source domain data and the target domain data after the alignment; and a learning means configured to train the feature extraction means based on the local features of the source domain data and the target domain data after the alignment and a classification result of the class.

(Supplementary Note 2)

The learning device according to supplementary note 1, wherein the alignment means includes a conversion parameter estimation means configured to estimate conversion parameters for converting input image data into image data of the reference angle; and a conversion means configured to convert the input image data by using the conversion parameters.

(Supplementary Note 3)

The learning device according to supplementary note 2, wherein the conversion parameter estimation means has been trained by using an image group generated by rendering source domain data of a specific class under a different condition and a reference image generated by rendering the source domain data of the specific class at the reference angle.

16

(Supplementary Note 4)

The learning device according to supplementary note 3, wherein the conversion parameter estimation means has been trained to minimize an error between the image group converted by using the conversion parameters and the reference image.

(Supplementary Note 5)

The learning device according to supplementary note 1, wherein the alignment means includes a conversion parameter estimation means configured to estimate conversion parameters for converting input image features into image features derived from an image of the reference angle; and a conversion means configured to convert the input image features by using the conversion parameters.

(Supplementary Note 6)

The learning device according to supplementary note 5, wherein the conversion parameter estimation means has been trained by using image features derived from an image group generated by rendering source domain data of a specific class under a different condition and image features derived from a reference image generated by rendering the source domain data of the specific class at the reference angle.

(Supplementary Note 7)

The learning device according to supplementary note 6, wherein the conversion parameter estimation means is trained to minimize an error between image features derived from the image group converted by using the conversion parameters and image features derived from the reference image.

(Supplementary Note 8)

The learning device according to any one of supplementary notes 1, 4, 6 and 7, wherein the rendering to generate the image group includes at least one of a change of an angle of a line of sight with respect to an object in an image, a change of a distance of the object in a depth direction in the image, a parallel movement of the object, an addition or a change of color of the object, an addition or a change of a pattern of the object, an addition of illumination with respect to the object, an addition of a background of the object, and an addition of noise.

(Supplementary Note 9)

The learning device according to any one of supplementary notes 1 to 8, wherein the feature extraction means extracts a plurality of image features from input image data, and outputs respective correlations among the plurality of image features as the local features.

(Supplementary Note 10)

The learning device according to any one of supplementary notes 1 to 9, wherein the learning means minimizes an error between a classification result of the class and a correct answer label, and trains the feature extraction means so that the local features of the source domain data and the local features of the target domain data are closer for the same class, and the local features extracted from the target and the local features extracted from source domain data are farther apart for different classes.

(Supplementary Note 11)

A learning method, comprising:

acquiring source domain data and target domain data;

performing an alignment which converts the source domain data and the target domain data into images of a predetermined reference angle;

extracting local features of the source domain data and the target domain data;

classifying a class based on the local features of the source domain data and the target domain data after the alignment; and training a feature extraction means based on the local features of the source domain data and the target domain data after the alignment and a classification result of the class.

(Supplementary Note 12)

A recording medium storing a program, the program causing a computer to perform a process comprising:

acquiring source domain data and target domain data;

performing an alignment which converts the source domain data and the target domain data into images of a predetermined reference angle;

extracting local features of the source domain data and the target domain data;

classifying a class based on the local features of the source domain data and the target domain data after the alignment; and training a feature extraction means based on the local features of the source domain data and the target domain data after the alignment and a classification result of the class.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

2 Target domain database
3 Source domain database
12 Processor
112, 122, 212, 222 Alignment unit
113, 114, 123, 124, 213, 214, 223, 224 Feature extraction unit
115, 125, 215, 225 Local feature extraction unit
131, 231 Feature discrimination unit
132, 232 Domain adaptation unit
143, 243 Conversion parameter estimation unit
144, 244 Conversion unit
100, 200 Learning device
100*x*, 200*x* Classification unit

What is claimed is:

1. A learning device comprising:

a memory storing instructions; and one or more processors configured to execute the instructions to:

acquire source domain data and target domain data;

perform an alignment which converts the source domain data and the target domain data into images of a predetermined reference angle;

extract local features of the source domain data and the target domain data by using a feature extraction;

classify a class based on the local features of the source domain data and the target domain data after the alignment; and train the feature extraction based on the local features of the source domain data and the target domain data after the alignment and a classification result of the class.

2. The learning device according to claim 1, wherein the processor is further configured to estimate conversion parameters for converting input image data into image data of the reference angle; and convert the input image data by using the conversion parameters.

3. The learning device according to claim 2, wherein the conversion parameter estimation has been trained by using an image group generated by rendering source domain data of a specific class under a different condition and a reference image generated by rendering the source domain data of the specific class at the reference angle.

4. The learning device according to claim 3, wherein the conversion parameter estimation has been trained to minimize an error between the image group converted by using the conversion parameters and the reference image.

5. The learning device according to claim 1, wherein the processor is further configured to estimate conversion parameters for converting input image features into image features derived from an image of the reference angle by a conversion parameter estimation; and convert the input image features by using the conversion parameters.

6. The learning device according to claim 5, wherein the conversion parameter estimation has been trained by using image features derived from an image group generated by rendering source domain data of a specific class under a different condition and image features derived from a reference image generated by rendering the source domain data of the specific class at the reference angle.

7. The learning device according to claim 6, wherein the conversion parameter estimation is trained to minimize an error between image features derived from the image group converted by using the conversion parameters and image features derived from the reference image.

8. The learning device according to claim 1, wherein the rendering to generate the image group includes at least one of a change of an angle of a line of sight with respect to an object in an image, a change of a distance of the object in a depth direction in the image, a parallel movement of the object, an addition or a change of color of the object, an addition or a change of a pattern of the object, an addition of illumination with respect to the object, an addition of a background of the object, and an addition of noise.

9. The learning device according to claim 1, wherein the feature extraction extracts a plurality of image features from input image data, and outputs respective correlations among the plurality of image features as the local features.

10. The learning device according to claim 1, wherein the processor minimizes an error between a classification result of the class and a correct answer label, and trains the feature extraction so that the local features of the source domain data and the local features of the target domain data are closer for the same class, and the local features extracted from the target and the local features extracted from source domain data are farther apart for different classes.

11. A learning method, comprising:

acquiring source domain data and target domain data;

performing an alignment which converts the source domain data and the target domain data into images of a predetermined reference angle;

extracting local features of the source domain data and the target domain data by a feature extraction;

classifying a class based on the local features of the source domain data and the target domain data after the alignment; and training the feature extraction based on the local features of the source domain data and the target domain data after the alignment and a classification result of the class.

12. A non-transitory computer-readable recording medium storing a program, the program causing a computer to perform a process comprising:

acquiring source domain data and target domain data;

performing an alignment which converts the source domain data and the target domain data into images of a predetermined reference angle;

extracting local features of the source domain data and the target domain data by a feature extraction;

classifying a class based on the local features of the source domain data and the target domain data after the alignment; and training the feature extraction based on the local features of the source domain data and the target domain data after the alignment and a classification result of the class.

* * * * *